US009180591B2

(12) United States Patent
McLean

(10) Patent No.: US 9,180,591 B2
(45) Date of Patent: Nov. 10, 2015

(54) ADJUSTABLE TOOL HANGER BOARD ASSEMBLY APPARATUS AND METHOD

(76) Inventor: Phil McLean, Richfield, OH (US)

( * ) Notice: Subject to any disclaimer, the term of this patent is extended or adjusted under 35 U.S.C. 154(b) by 116 days.

(21) Appl. No.: 13/250,614

(22) Filed: Sep. 30, 2011

(65) Prior Publication Data

US 2013/0081249 A1    Apr. 4, 2013

(51) Int. Cl.
| | |
|---|---|
| A47F 5/08 | (2006.01) |
| B25H 3/04 | (2006.01) |
| A47B 83/00 | (2006.01) |
| A47B 95/00 | (2006.01) |
| B60P 3/14 | (2006.01) |

(52) U.S. Cl.
CPC .............. B25H 3/04 (2013.01); A47B 83/001 (2013.01); A47B 95/008 (2013.01); A47F 5/0846 (2013.01); B60P 3/14 (2013.01); Y10T 29/49826 (2015.01)

(58) Field of Classification Search
CPC .. A47F 5/0846; A47B 83/001; A47B 95/008; B60P 3/14
USPC ......... 248/225.11, 223.21, 309.1, 316.8, 339; 211/87.01, 90.01, 94.01, 94.02, 175, 211/70.6, 189; 29/428; 269/309; 81/490; 224/400, 402, 403, 441, 451, 459, 545; 296/37.1, 37.6
See application file for complete search history.

(56) References Cited

U.S. PATENT DOCUMENTS

| | | | | | |
|---|---|---|---|---|---|
| 4,678,151 | A | * | 7/1987 | Radek | A47F 5/0846 211/59.1 |
| 4,809,479 | A | * | 3/1989 | Tierno | E04F 13/0864 211/189 |
| 5,819,490 | A | * | 10/1998 | Current | A47F 5/0846 211/94.01 |
| 6,007,129 | A | * | 12/1999 | Kearney, Jr. | B60R 11/06 224/404 |
| 6,116,435 | A | * | 9/2000 | Young | 211/94.01 |
| 6,134,846 | A | * | 10/2000 | Lamb | 52/36.5 |
| 6,164,467 | A | * | 12/2000 | DePottey | A47F 5/0846 211/189 |
| 6,325,223 | B1 | * | 12/2001 | Hannen | A47F 5/0846 211/87.01 |
| 6,817,653 | B2 | * | 11/2004 | Ropp | B60P 3/14 224/403 |
| 6,837,384 | B2 | * | 1/2005 | Secondino | A47F 5/0846 211/87.01 |
| 6,929,303 | B1 | * | 8/2005 | Sharples | B60J 7/1621 296/100.05 |
| 6,971,614 | B2 | * | 12/2005 | Fischer | A47F 5/0846 211/94.01 |
| 7,189,159 | B2 | * | 3/2007 | Caldwell | F24F 11/053 454/258 |
| 7,748,764 | B2 | * | 7/2010 | Frankham | B60P 3/14 296/182.1 |
| 8,267,363 | B2 | * | 9/2012 | Begic et al. | 248/221.11 |
| 2004/0251227 | A1 | * | 12/2004 | Perkins et al. | 211/189 |
| 2014/0239028 | A1 | * | 8/2014 | Fakhari | B60P 3/14 224/555 |

FOREIGN PATENT DOCUMENTS

JP    2007-321464    * 12/2007

* cited by examiner

*Primary Examiner* — Todd M Epps
(74) *Attorney, Agent, or Firm* — Buckingham, Doolittle & Burroughs, LLC

(57) ABSTRACT

The invention relates to an adjustable hanger board assembly for mounting tools to a wall, the inside of a vehicle compartment, on a wall, on a ceiling on a floor or other flat surface. Each hanger board assembly has a plurality of horizontal slots and/or vertical slots and or angular slots and optionally a repeating pattern of mounting through-holes capable of accepting a wide variety of existing fastening hardware and tool brackets. The fastening hardware is adjustably fastened along the horizontal slots and/or vertical slots and or angular slots which serve as mounting tracks for hanging brackets and other tool securing devices. The fastening hardware is similarly adjustable in a plurality of through-holes in the hanger board assembly.

13 Claims, 8 Drawing Sheets

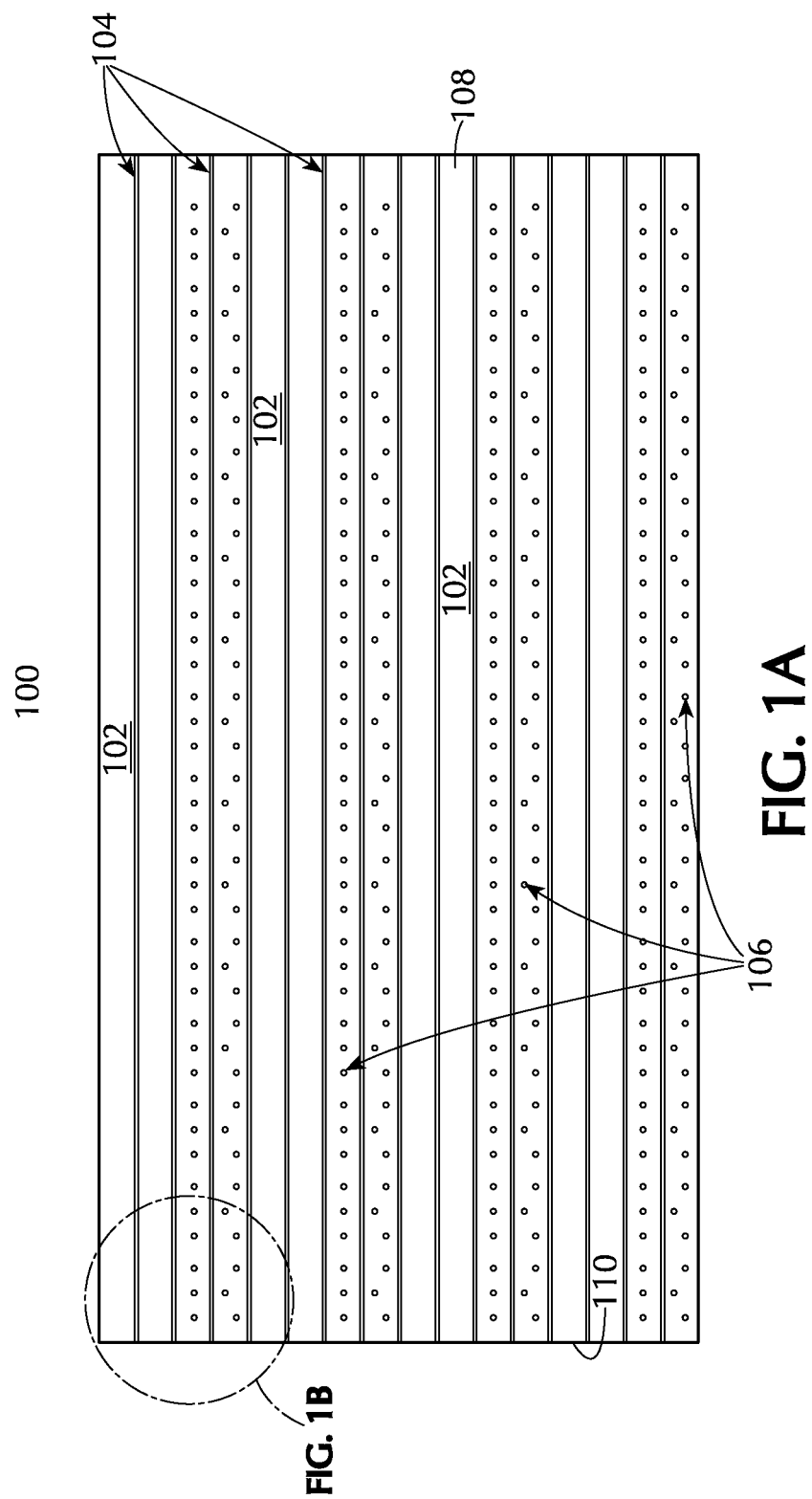

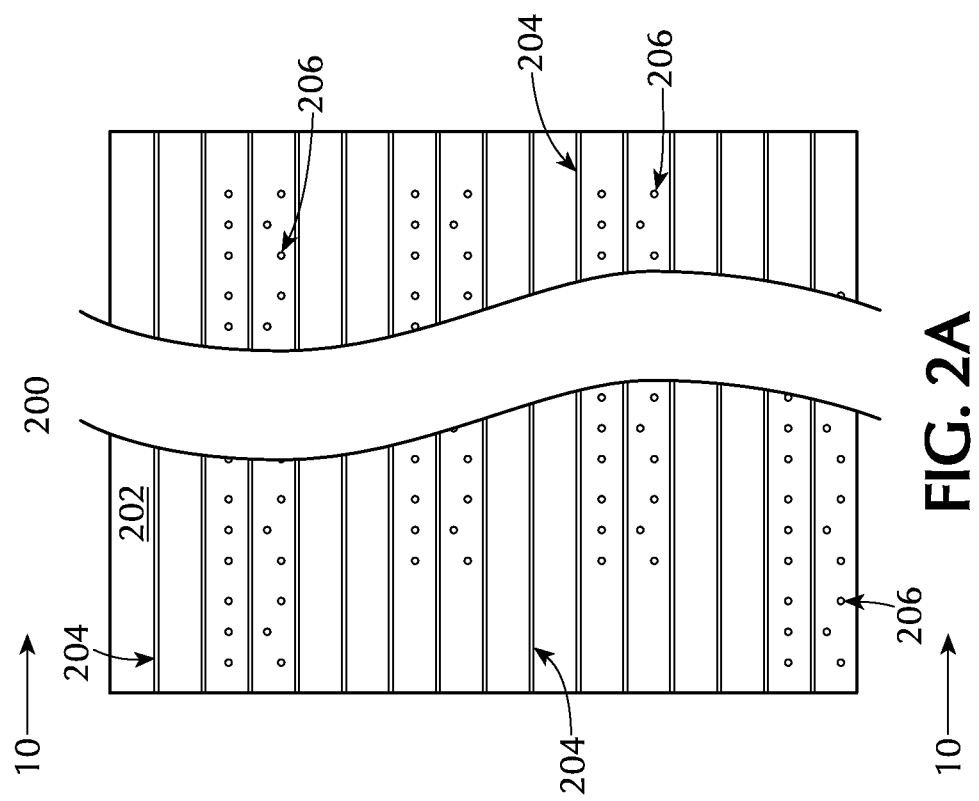
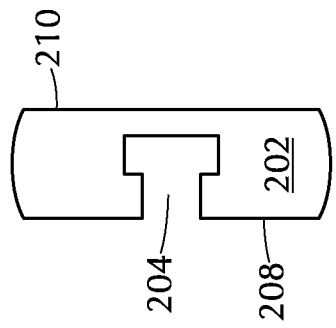

ADJUSTABLE TOOL HANGER BOARD ASSEMBLY APPARATUS AND METHOD

FIELD OF THE INVENTION

The invention relates generally to an adjustable tool mounting platform hanger board assembly that is mountable to a wall, ceiling, floor of a structure or to the inside of a vehicle compartment that is capable of holding a variety of equipment in place on both horizontal, vertical and random axes by using a wide variety of existing and/or custom hardware and tool brackets that is easily machined and reconfigured and a method of mounting tools using the same.

BACKGROUND OF THE INVENTION

Although the prior art teaches many devices for mounting tools to a wall, all of these teachings demonstrate limitations that the present invention addresses and overcomes.

For example, storing tools and equipment in structures and on vehicles in a safe and efficient manner that can accommodate all of the needs of a business or other entity is a widespread problem. Non-uniform equipment, different truck manufacturers, local needs, budget constraints, hard to mount bulky equipment, the need for uniformity in equipment layout, and the like, are issues that fire departments and/or industrial/commercial/residential buildings, for example, throughout the world face when determining how to outfit an emergency vehicle or building for service. Considering that fire apparatus, for example, may cost upward of a million dollars, few agencies if any can afford to outfit their entire department fleet. The vast majority of departments have only a few vehicles that are replaced, for example, one at a time every ten to twenty years or more. Similarly, most fire departments employ a wide assortment of different tools and equipment that due to size, hazards, and configuration, that are difficult to store in an arrangement where they are easily accessible yet safely transported.

To combat this problem, for example, many departments employ a firefighter that specializes in outfitting his department's trucks with tools to best fulfill that department's unique needs. Since most fire apparatus are constructed with a variety of materials, this task can easily become extremely complicated. This can create a dilemma if the specialist is on vacation during the outfitting of the truck, transfers to a different fire station, or retires. The firefighter must not only be familiar with the local department's equipment, but he often has to have extensive knowledge in woodworking, metal working, plumbing, electrical systems, engineering, and the like. If the individual makes mistakes in installation, many departments choose to live with the mistakes rather than correct them due to the time and expense of keeping the truck out of service. This can lead to inefficiency or even a dangerous condition during an emergency situation if a tool is urgently needed but is difficult to access. These "mistakes" in installation could potentially hinder emergency responders during the entire life of the vehicle.

Currently, many departments mount tools directly to stainless steel or aluminum walled compartments or other vehicle surfaces with a wide array of fastening devices. Others make wood backer boards to affix to the compartment wall or employ an expensive commercially made mounting board, tray, or movable panel system. The most common deficiency in all of these solutions is that they are difficult to modify once installed on the vehicle. Once a system is mounted or installed on a vehicle, it often is semi-permanent. Fire equipment and tools used in firefighting are constantly evolving and being replaced to meet changing needs. Therefore, a system that is easily modifiable once in place would be extremely desirable.

Another issue is that compartment space on a fire apparatus is limited. Departments need the ability to get the most efficient and maximum storage capability out of every vehicle. Considering the wide variety of emergencies, every additional tool or piece of equipment that a fire truck can carry is critical and potentially lifesaving. A hanger board apparatus that allows for the maximum efficiency in use of compartment space that is easily modifiable by those without specialized skills to keep up with the most current equipment would be advantageous.

While space maximization and ease of modification are significant issues by themselves, aesthetics are also important to fire departments. A fire truck is a common sight at a parade, a school safety demonstration, or other situation where the public expects to see a shiny polished fire truck. Aluminum, brushed stainless steel, and wood backed compartments are difficult to keep clean, unscratched, and polished considering the conditions that they and the tools mounted therein must endure on a daily basis. Oil, dirt, soot, and other contaminants are common. Since the public, especially children, commonly come in contact with these vehicles, a storage system should be easily cleanable not just for aesthetics, but for public safety.

Wall-based storage components that employ rails, channels, holes, and slots are well known in the art. For example, pegboards allow a user to accommodate objects of different sizes and shapes in a customized array. U.S. Pat. No. 5,853,091 to Goodman et al., uses a modified form of a pegboard where permanently attached hooks clamp upon pressure allowing a tool to be pressed onto the board and still hang from a hook. This allows the prior art invention to adapt to the size and shape of different objects and permits easy rearrangement and versatility in tool layout. However, the prior art invention would not be well suited to mounting in a vehicle compartment. The hooks retract backward and would be prevented from functioning by the back wall of the compartment. The only way that this could be used in a vehicle would be to place it far enough forward in the compartment to permit the hook retraction at the expense of limited valuable compartment space. Another limitation is that the only mounting hardware are hooks which significantly limit the type of tools that are held.

In yet another prior art tool hanging device, U.S. Pat. No. 6,131,866 to Kesinger utilizes a track hanger assembly with a T-shaped longitudinal channel that uses commercially available hangers to hold tools. However, the prior art invention also has limitations that restrict its use in a vehicle compartment. The invention teaches a channel track which would only permit horizontal storage. Another problem that it does not solve is mounting equipment that does not hang from a bracket, for example a can of gasoline or a chain saw. Additionally, the fact that it is a track and not a mounting board limits the efficient use of space throughout an entire vehicle compartment.

Another example of a prior art invention for hanging tools that could be used in a vehicle compartment is taught by U.S. Pat. No. 6,116,435 to Young. This extruded aluminum mounting channel assembly uses a channel with repositionable glass/nylon inserts for holding tools or brackets. While it allows for repositionable tool mounting on either a horizontal axis or a vertical axis only, it suffers many other limitations for ideal tool mounting in a vehicle compartment. For example, the extruded aluminum is manufactured in 8 and five eighths inch widths and 10 foot lengths. While the length can be cut to fit, the width cannot be modified because of the extrusion. Therefore, attempting to fit an entire compartment with these panels would likely leave a significant amount of unused wall space. Another restriction is that it requires specialized hardware to mount tools and only accepts number 10 screws. Additionally, extruded aluminum is expensive and cannot be easily re-machined or cleaned. Also there is a danger of a chemical interaction leading to corrosion between dissimilar metals if it contacts steel or other metals commonly used in vehicles or attaching hardware. These deficiencies, as well as others prevent this assembly from being an ideal mounting platform in many vehicle compartments.

Therefore, a need remains for an economical tool and equipment mounting platform for a structure or vehicle compartment that is easy to manufacture, machine, and reconfigure that can maximize the efficiency of each individual space that is easy to instill and relocate, adjustable, easy to clean, and has the ability to simultaneously mount tools on both a horizontal, vertical and angular axis using a wide variety of existing hardware. More specifically, a need exists for an adjustable hanger board assembly apparatus that allows for customized vehicle compartment tool mounting in vehicles comprising fire department apparatus, emergency vehicles, ambulances, military vehicles, construction vehicles, both residential and commercial real estate and other location known by those of skill in the art, or by use in any agency that utilizes mounting platforms and a method of the same.

SUMMARY OF THE INVENTION

Accordingly, the present invention overcomes the limitations of the prior art by providing a unique, inexpensive and adjustable tool mounting platform hanger board assembly that is capable of mounting tools and equipment with existing and custom hardware both horizontally, vertically and along an angle in a vehicle compartment, in residential, commercial and industrial applications and is easy to reconfigure and keep clean. More particularly, the invention includes a hanger board assembly that is versatile enough to mount tools and equipment, for example, related to firefighting departments using off the shelf mounting hardware in a fire truck vehicle compartment with more efficient use of compartment space that is easy to reconfigure with basic common tools that do not require specialized skills to operate and a method of the same. Although the invention will be described with respect to fire trucks, it would work equally well in locations comprising vehicles, industrial/commercial/residential buildings and garages.

Consequently, the following presents a simplified summary of the invention in order to provide a basic understanding of some aspects of the invention. This summary is not an extensive overview of the invention. It is intended to neither identify key or critical elements of the invention nor delineate the scope of the invention. Its purpose is to present some concepts of the invention in a simplified form as a prelude to the more detailed description that is presented later.

It is an object of the present invention to provide an adjustable tool mounting platform hanger board assembly comprising a solid mounting platform body member having a plurality of channel elements and a plurality of mounting hole elements for receiving mounting hardware.

It is a further object of this invention to present an adjustable tool mounting platform hanger board assembly comprising a solid mounting platform member having a plurality of machined channel elements and a plurality of mounting hole elements for receiving mounting hardware that is attachable to a plurality of surfaces in a vehicle compartment.

It is an object of the present invention to provide an adjustable tool mounting platform hanger board assembly that is made of a material comprising high-density polyethylene.

It is a further object of this invention to present an adjustable tool mounting platform hanger board assembly for locations comprising vehicles, industrial/commercial/residential buildings and garages.

It is an object of the present invention to provide an adjustable tool mounting platform hanger board assembly where a plurality of channel elements are undercut in a plurality of shapes.

It is yet a further object of the present invention to provide an adjustable tool mounting platform hanger board assembly that is scratch resistant, chemical resistant, and corrosion resistant.

It is another object of the present invention that in an adjustable tool mounting platform hanger board assembly a plurality of channel elements and a plurality of mounting hole elements that accept both off the shelf mounting hardware and specialty hardware.

It is an additional object of the invention to provide an adjustable tool mounting platform hanger board assembly that is adaptable to fit and is mountable to a plurality of surfaces comprising vehicle, building, restaurant, tool room, and closet compartment interior surfaces.

It is an additional object of the invention to provide an adjustable tool mounting platform hanger board assembly for use in or on emergency vehicles.

It is yet a further object of the present invention to provide an adjustable tool mounting platform hanger board assembly for use in stationary applications and in vehicles used in firefighting, the military, construction, maintenance, aircraft, watercraft, and permanent or temporary storage structures.

It is yet another object of this invention to provide an adjustable tool mounting platform hanger board assembly that is made of a material comprising thermoplastics, metals, alloys, composite materials, wood, plastics, polymers, and resins.

It is another embodiment of the present invention to provide an adjustable tool mounting platform hanger board assembly capable of mounting a plurality of tools and equipment of different sizes and configurations in a vehicle compartment that maximizes the use of a compartment's space.

It is another embodiment of the present invention to provide an adjustable tool mounting platform hanger board that is easy to machine and reconfigure.

It is yet another object of this invention to provide an adjustable tool mounting platform hanger board assembly where the tool layout is determined by a computer software program.

It is an additional object of the invention to provide a method of mounting tools and equipment on an adjustable tool mounting platform hanger board assembly in a vehicle compartment that maximizes use of compartment space and permits easy modification to accommodate fewer, additional, or different tools and equipment.

BRIEF DESCRIPTION OF THE DRAWINGS

Embodiments of the invention will now be described with reference to the accompanying drawings:

FIG. 1A illustrates a plan view of an adjustable hanger board assembly comprising a plurality of substantially parallel slot elements and mounting hole elements according to an aspect of the present invention.

FIGS. 2A, 2B, 2C and 2D are partial views of the invention according to yet another aspect of the present invention.

DETAILED DESCRIPTION OF THE INVENTION

Figure 1C:
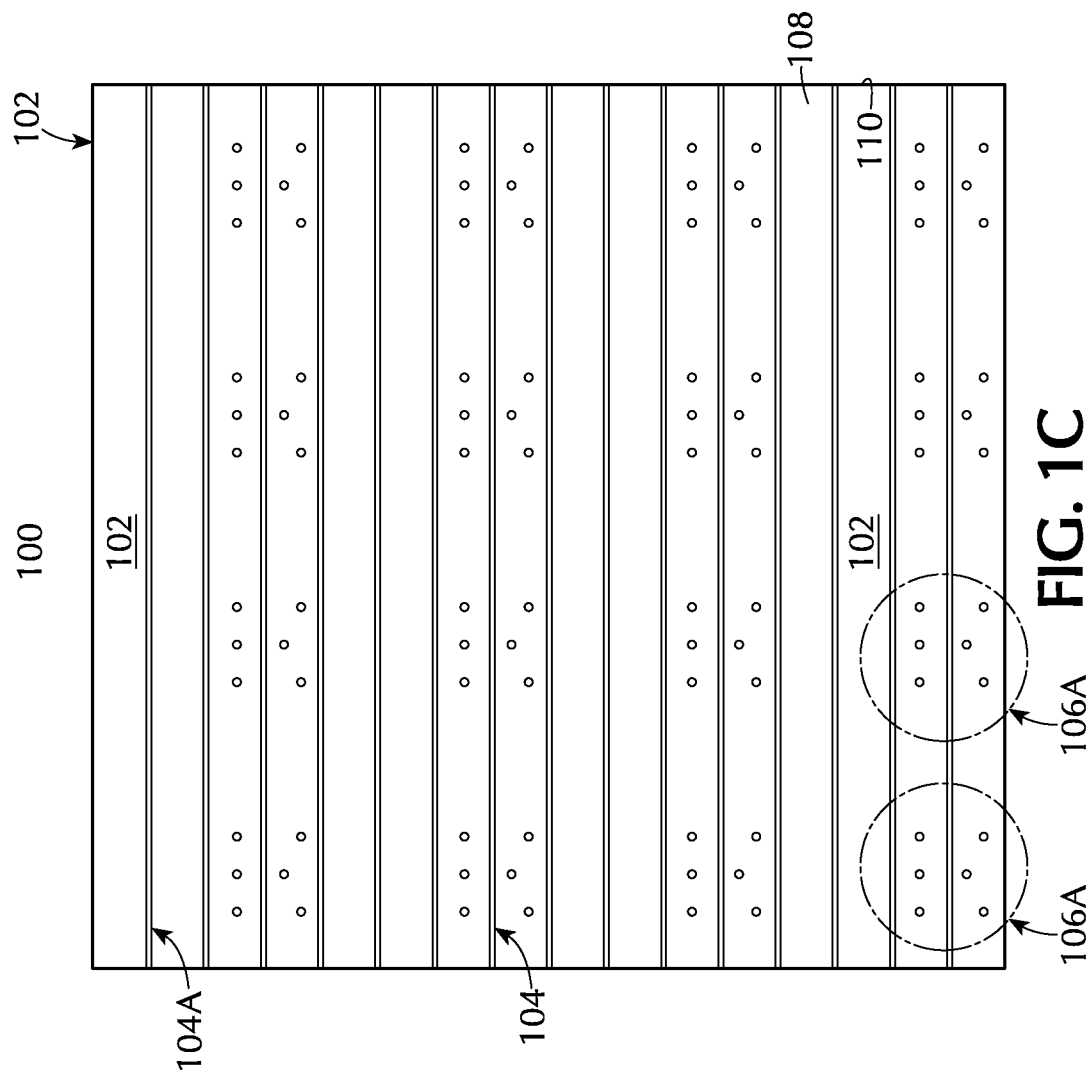
FIG. 1C illustrates a fragmentary end elevation view or the invention taken substantially in the direction of arrows 10-10 of FIG. 2A according to an aspect of the present invention.

One or more implementations of the present invention will now be described with reference to the attached drawings, wherein like reference numerals are used to refer to like elements throughout. The invention relates generally to an adjustable tool mounting platform hanger board assembly that is mountable to the inside of a vehicle compartment or structure that is capable of holding a variety of products in place by using a wide variety of existing tool brackets and hardware that is easily machined and reconfigured and a method of mounting tools using the same.

Referring initially to FIG. 1, a plan view of a hanger board assembly 100 according to one embodiment of the invention is shown. The hanger board assembly 100 comprises mounting platform body members 102, slot elements 104, and hole elements 106 for mounting tools and equipment three-dimensionally in a compartment space, for example. Although the board is described with respect to vehicles, one skilled in can utilize a hanger board assembly for mounting devices in structures comprising buildings, structures, tool rooms and restaurants. The mounting platform body member 102 further comprises an inner surface 110 and an outer surface 108. When the mounting platform body member 102 is mounted on a wall or other surface, for example, the inner surface 110 faces or is mounted adjacent to the wall surface while the outer surface 108 faces away from the wall surface. While in the preferred embodiment the mounting platform body member 102 is substantially solid in construction, the inner surface 110 and outer surface 108 may be modified assemblies comprising honeycombed structures, structures having lightening holes, or otherwise have structural material removed for reasons comprising economic considerations, aesthetics, weight reduction, and other reasons known by those of skill in the art.

The mounting platform body member 102 material can comprise high density polyethylene (HDPE) and polyethylene high-density (PEHD). These materials are desirable because of ease of machining and because the material removed in the machining process does not create structures comprising sharp fragments, splinters, or other sharp edges that may endanger the machinist or user. However, versions of the mounting platform body member 102 where the material can comprise plastics, thermoplastics, metals, metal alloys, composite materials, polymers, woods, acetyl materials, resins, and combinations thereof, and the like are also considered to be within the scope of the invention. An additional benefit of using the HDPE, e.g., for the mounting platform body member 102 is that has properties comprising scratch resistance, corrosion resistance, chemical resistance, and is easily cleanable. The preferred embodiment of the invention involves the mounting platform body member 102 that is machinable, however, the inventor also recognized that non-machinable embodiments such as extruded versions may be useful for various applications and are considered to be within the scope of the invention.

Fabrication of an embodiment of the hanger board assembly 100 may start with stock HDPE or other mounting platform body materials in four by eight foot sheets, for example, that are one-half or five eighths inches thick and are easily machinable with standard machine shop equipment such as CNC machines, drills, lathes, saws, routers, and the like. The dimensions for the stock materials listed above are enumerated due to ease of use and availability. However, applications where the invention uses non-standard sized stock comprising any manufactured length, width, and depth obtainable are also envisioned. For example, an application may require a piece of stock material that is twelve by twenty feet and six inches thick be used to hold heavy equipment and sized to fit the specification of a military vehicle, while conversely a piece of stock material that is only two tenths of an inch thick could be more appropriate for a display model. These measurements were enumerated merely for exemplary purposes and are not meant as a limitation on the hanger board assembly's dimensions.

Additionally, a plurality of hanger board assemblies (not shown) may be placed adjacent to or fixedly or non-fixedly attached to each other to fill a space larger than available individual stock material. For example, the hanger board assemblies could interlock or be otherwise connectable with each other on any side like a jig saw puzzle. Similarly, a plurality of hanger board assemblies may be stacked or affixed on top of each other to create an embodiment that is thicker than a single piece of the individual stock material. In addition, the material can have shapes comprising variable thickness and variable lengths.

Once a piece of stock HDPE, for example, is selected, the material can be cut and machined into any desirable shape necessary for the application. For example, in one embodiment the invention may require that a hanger board assembly be machined so that a mounting platform body member is rectangular in shape with a width of four feet and a length of six feet. In this example, the stock piece could have two feet trimmed off of the length. However, this size and shape is not meant as a limitation as any sized or shaped mounting platform body member that could be cut out of the piece of stock is conceived. For example, the shape may comprise geometric shapes such as a square, rectangle, trapezoid, oval, circle, triangle, and the like, or may comprise any irregular two-dimensional shape or three-dimensional shapes. Additionally, as disclosed above, several pieces of stock could be used in combination to create a mounting platform body member of a larger size or shape than the single pieces of stock.

Another application for the invention entails that a hanger board assembly be cut to fit a surface or part of a surface inside of a vehicle compartment such as for example, the back wall. Vehicles and structures that may benefit from this invention include, but are not limited to any structures comprising , buildings, homes construction vehicles, heavy equipment vehicles, transportation vehicles, trailers, campers, recreational vehicles, trains, shipping vessels, aircraft, watercraft, ambulances, firefighting vehicles, emergency vehicles, and the like. For illustration, a fire engine has multiple compartments for carrying tools and equipment of various sizes. Two hanger board assemblies in this instance could be sized to fit along a back wall and a floor of a compartment. The assemblies may be attached to the truck by components comprising screws, bolts, glue, brads, brackets, adhesives, or any other fastening method known to one skilled in the art. While many applications will be used inside structures and vehicle compartments, a hanger board assembly can be mountable on any surface comprising stationary and movable objects such as a structural wall as well.

Figure 2D:
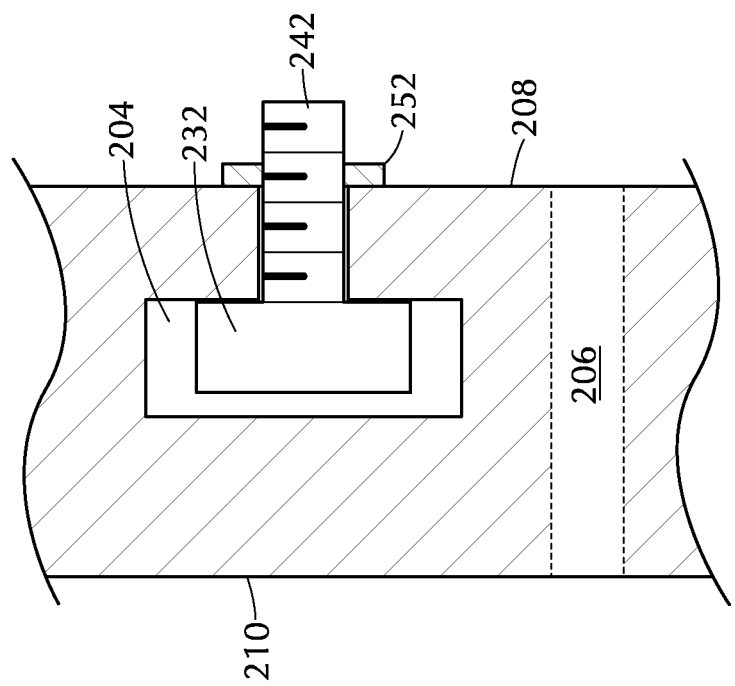

Referring now to FIG. 2A, an embodiment of a hanger board assembly 200 can comprise a plurality of parallel slot elements 204 cut at approximately three inch intervals, for example, that extend along an entire horizontal axis of a mounting platform body member 202. The slot elements 204 may be machined as undercut channels that extend inward from an outer surface 208 (FIG. 2B) WHERE IS THIS SHOWN IN FIG. 2A? toward an inner surface 210 (FIG. 2B) and be arranged parallel to each other. However, slot elements may be machined at any distance apart between centers, for example, can be a single slot element machined comprising, vertically, perpendicularly, on an angle, intersecting with other slot element(s), or any combination thereof known by one of skill in the art and still be within the scope of the invention.

In an actual embodiment of the mounting platform body member 202 as shown in FIG. 2A being 0.5 inches thick, slot elements 204 are T-shaped with approximate dimensions of the overall slot element 204 depth being approximately 0.375 inches, an opening at an outer surface 208 being approximately 0.265 inches and extends approximately 0.2 inches deep then opens to a width of approximately 0.437 inches for approximately the last 0.175 inches of depth. While this example describes the slot elements 204 as having a T-shape of specific dimensions, the slot elements 204 may be of any dimensions desirable and of any shapes comprising L-shaped, conical, triangular, beaker shaped, beveled, and any other geometric or irregular shape, and the like, that is known of one of ordinary skill in the art as useful for mounting equipment to a surface.

Slot elements are configured to hold fastening hardware comprising bolts, nuts, screws, plugs, wall anchors, and the like, that may be used to attach brackets, hooks, shelves, and the like or any type of tool mounting hardware that is known to one of skill in the art for hanging, mounting, or otherwise securing tools and equipment to a surface at any position along the slot elements. While this embodiment illustrates a mounting platform body member that has the slot elements machined into the outer surface, the slot elements may also be lined or reinforced with a different material to decrease wear or otherwise strengthen the slot element, for example, metals, coatings and other materials known by those of skill in the art. Additionally, spacers (not shown) may be used to fit in the unused portion of slot elements to keep hardware in place or prevent movement along the slot elements especially if the slot elements intersect other slot elements.

While the mounting body platform member 202 may be initially configured in a machine shop prior to installation, additional said slot elements 204 may be machined on site or even in place after installation. Therefore, if a user's needs or equipment layout changes after installation, the hanger board assembly 200 (FIG. 2A) is easily reconfigurable in place with basic tools to accommodate the changes at less expense and more quickly than, for example, ordering and reinstalling an entire new tool mounting system. Additionally, the old or unused slot elements 204 may be, for example, refillable or pluggable when no longer needed. Another embodiment of the invention includes a hanger board assembly 200 where slot elements 204 extend inward from an outer surface 208 toward an inner surface 210 and where the additional slot elements 204 extend inward from the inner surface 210 toward the outer surface 208 so that both sides of the mounting body platform member 202 could be used to hold tools and equipment and the hanger board assembly 200 slides out along a track, for example.

The embodiment of the hanger board assembly 200 may further comprise a plurality of hole elements 206 that penetrate at least the outer surface 208 of the mounting platform body member 202. The plurality of hole elements may penetrate the entire depth of the mounting platform body member 202, the outer surface 208 only, the inner surface 210 only, and any combination of penetrations thereof. The hole elements 206 may be used to hold fasteners for attaching tool mounting hardware to the hanger board assembly 200 and may be used to mount the hanger board assembly 200 directly to a surface such as the wall of a vehicle compartment as well.

The hole elements 206 may be machined into the mounting platform body member 202 by techniques comprising drilling, cutting, boring, milling, reaming, tapping, routering, punch press, and the like. Similarly, the hole elements 206 may be fabricated using configurations comprising beveled, countersunk, v-shaped, and threaded, and the like. The hole elements 206 may be of any size, shape or geometry necessary to accommodate a wide variety of fasteners, and may be of the same or of different sizes and configurations. The hole elements 206 may permit the insertion of a fastener such as a screw (not shown) from either the inner surface 210 or the outer surface 208. While this embodiment teaches hole elements 206 that do not have a liner, the scope of the invention includes said hole elements 206 that may also be lined or reinforced with components comprising a different material (e.g., comprising metal, polymers, etc.), flanged, or that use grommets to decrease wear or otherwise strengthen the hole elements 206.

Figure 1B:
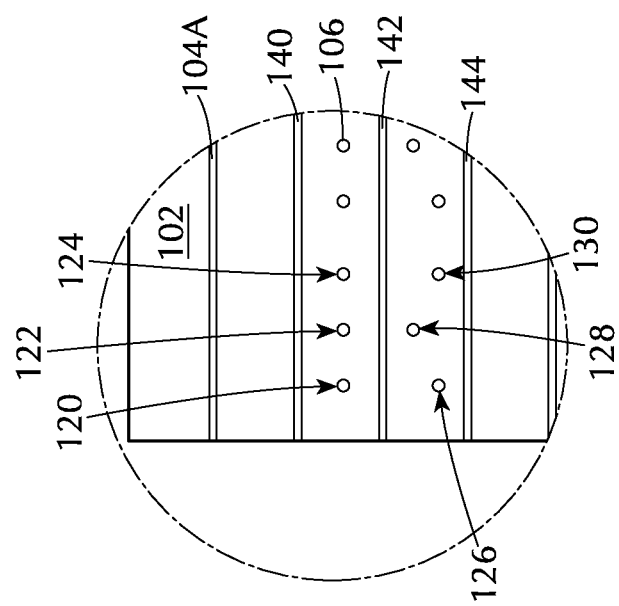
FIG. 1B illustrates a partial plan view of the invention with an enlarged view of a slot configuration illustrated in FIG. 1A according to yet another aspect of the present invention.

Illustrated in FIGS. 1B, 1C and 2B the hole elements 206 may be positioned anywhere on the mounting platform body member 202 and may or may not follow a repeating pattern. For example only, one embodiment of a hole element layout 106A with a repeating pattern is described in FIGS. 1B and 1C where the slot elements 104 and the hole elements 106 are aligned in the hole element layout 106A that runs throughout the entire hanger board assembly 100. In this design, the hole elements 106 are substantially circular in shape with a diameter of approximately 0.311 inches. The slot elements 104 form a repeating horizontal pattern and are approximately three inches apart with the first slot element 104A approximately three inches from the top of the mounting platform body member 102. The hole elements 106 likewise form the hole element layout 106A as groupings of six. The first three of the hole elements 106 are the top hole elements 120, 122, and 124 in the grouping and are approximately two inches apart horizontally and are approximately midway vertically between two of the slot elements 140 and 142. The other three of the hole elements 106 in the grouping are the bottom hole elements 126, 128, and 130 that are also approximately two inches apart horizontally and are positioned between the bottom slot element 142 of the above grouping of the top hole elements 120, 122, and 124 and the slot element 144 directly below, and are substantially inline vertically with the corresponding top hole elements 120, 122, and 124 above. While the top hole elements 120, 122, and 124 are approximately midway between the corresponding slot elements 140 and 142, the bottom hole elements 126, 128, and 130 vary in vertical distance between the slot elements 142 and 144. The first in line of the bottom hole elements 126 is located approximately 3.375 inches directly below the corresponding top hole element 120. The second in line of the bottom hole elements 128 is located approximately 2.5 inches directly below its corresponding top hole element 122. The third in line of the bottom hole elements 130 is located approximately 3.375 inches directly below its corresponding top hole element 124. The pattern then repeats with the next grouping of the hole elements 106 starting over approximately 2.563 inches horizontally away from the last hole elements 124 and 130 of the first grouping.

Turning to FIGS. 2A and 2B, the hole elements 206 can comprise a plurality of fastener inserts (not shown) for accepting fastening hardware to attach mounting hardware, like the slot elements 204 described above. The fastener inserts (not shown) may comprise rigid or soft sleeves, expandable inserts such as drywall type anchors, threaded inserts and the like; and may be held in place in the hole elements 206 by factors comprising friction, fastener teeth, expansion due to placement of a fastener, threads, and the like. Similarly, for example, a nut for accepting a screw or bolt may be implanted or countersunk into the inner surface 210 of the hole element 206 to hold the fastener in place.

Figure 2C:
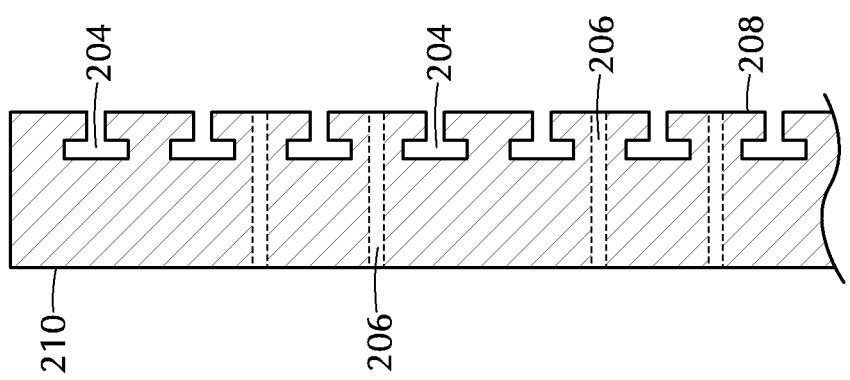

As discussed above, while the mounting body platform member 202 may be initially manufactured in a machine shop prior to installation, additional hole elements 206 may be machined on site or even in place after installation. Similarly, the hole elements 206 are also pluggable or refillable when not needed. This permits adaption of the hanger board assembly 200 to accommodate new tools or changing needs for tool and equipment layout easily and inexpensively, while avoiding unsightly unused holes. Referring to FIG. 2C illustrated is a partial side cross sectional view 10-10 from FIG. 2A of the hanger board assembly 200 (FIG. 2A). FIG. 2C shows T-shaped slots 204 for accepting various shaped fasteners that would fit in the T-shaped slots 204. FIG. 2C also illustrates hole elements 206 can be machined prior to installation of the hanger board assembly 200, can be machined on site or even in place after installation. A slot element fastener 240 is illustrated in the T-shaped slot 204 with a fastener head 232 inside the wider portion of the T-shaped slot 204. The threaded portion 242 of the fastener 240 is fastened in place by a nut element 244. The fasteners can comprise threaded fasteners, shoulder screws, hex bolts, hex socket screws, sheet metal screws, lag bolts, lag screws and other fasteners known by those of skill in the art.

Figure 3:
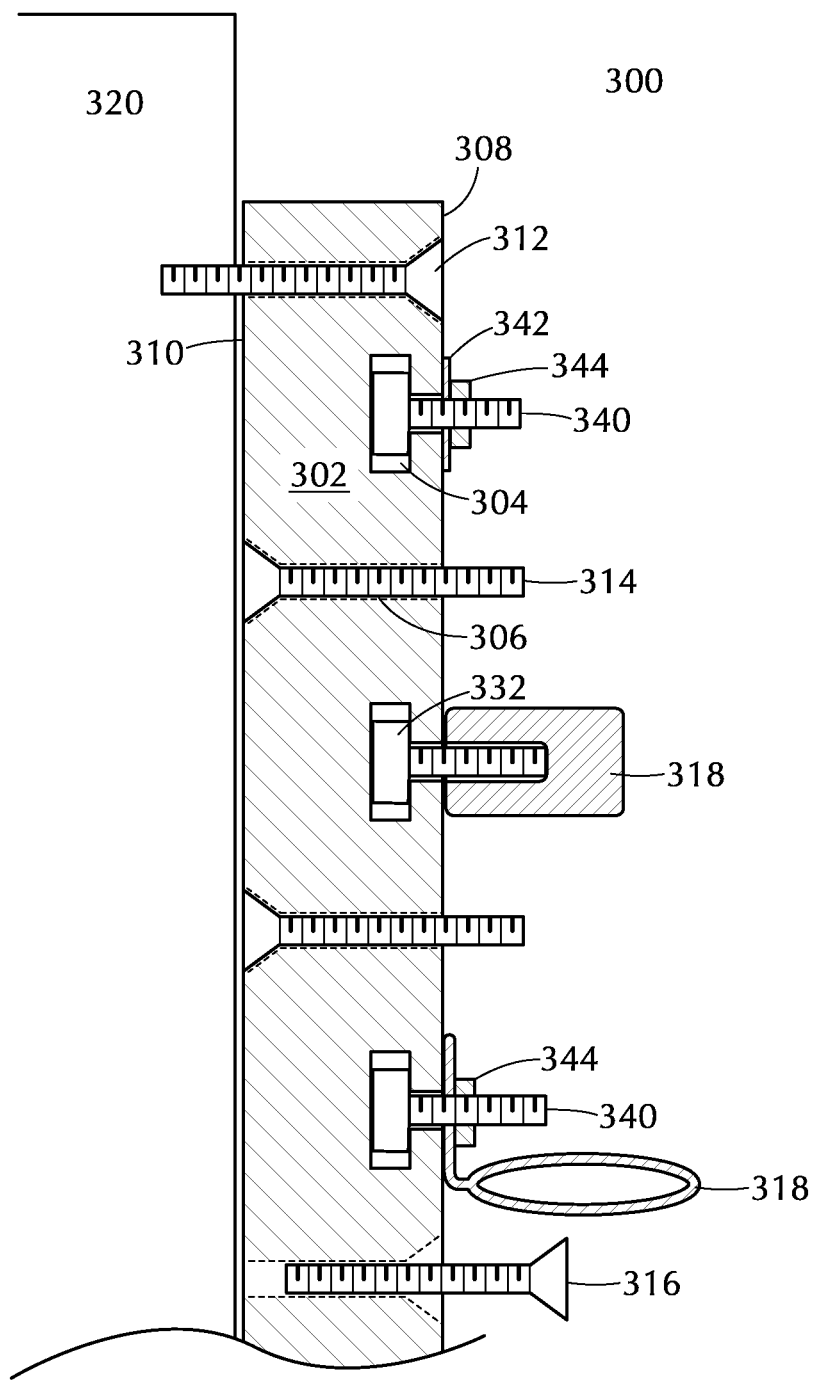
FIG. 3 illustrates a partial side view of the invention with an example fastener and tool layout configuration according to yet another aspect of the present invention.

Referring now to FIG. 3, another embodiment of a hanger board assembly 300 is shown where a plurality of slot elements 304 and a plurality of hole elements 306 are employed to engage a variety of fastener elements 312, a plurality of rear hole fastener elements 314, tool mounting hardware elements 318 and slot element fasteners 340, in a mounting platform body member 302. The hanger board assembly 300 is mounted, for example, to a vehicle side wall surface 320 in a vehicle compartment. The hanger board assembly 300 in this embodiment is attached to the vehicle side wall surface 320 with a mounting fastener element 312, for example, a countersunk screw running through the mounting platform body member 302 from an outer surface 308 through an inner surface 310 and into the vehicle side wall surface 320.

Prior to mounting, any of a plurality of rear hole fastener elements 314 insertable from the inner surface 310 through the mounting platform body member 302 may be pre-inserted. Other fasteners and hardware may be installed on a mounting platform body member before or after mounting. If installed after mounting, once tool layout is determined, a plurality of bracket or other tool mounting hardware elements 318 may be positioned and attached to the rear hole fastener elements 314 and to a plurality of front hole fastening elements 316 insertable from the outer surface 308. Other tools and equipment may be mounted to the mounting platform body member 302 with a plurality of the slot element fasteners 340. The slot element fasteners 340 may be positioned at a desired mounting position along the length of the plurality of slot elements 304 and are then attached to the bracket or other tool mounting hardware elements 318 by screwing directly into the bracket or other tool mounting hardware element 318 itself, or with another attaching mechanism comprising a washer element 342 and a nut element 344.

In addition to the embodiment mentioned above a hanger board assembly may be used with a wide variety of existing off the shelf fasteners comprising bolts, rivets, screws, nails, dowels, washers, spacers, plugs, wall anchors, spikes, wedges, flanged hardware, hooks and custom designed fasteners as well. Similarly, a hanger board assembly may use mounting tool and equipment hardware comprising brackets, straps, hangers, hooks, pins, rods, shelving, and the like, or any other tool mounting hardware that would be used and/or known by one skilled in the art. Additionally, tool mounting hardware may be affixed by methods comprising sliding along slot elements from any outer surface in the hanger board assembly and locking in place, inserting at an angle and snapping in place, by use of spacing elements (not shown), gravity, friction, and other affixing methods known by one of skill in the art.

Figure 4:
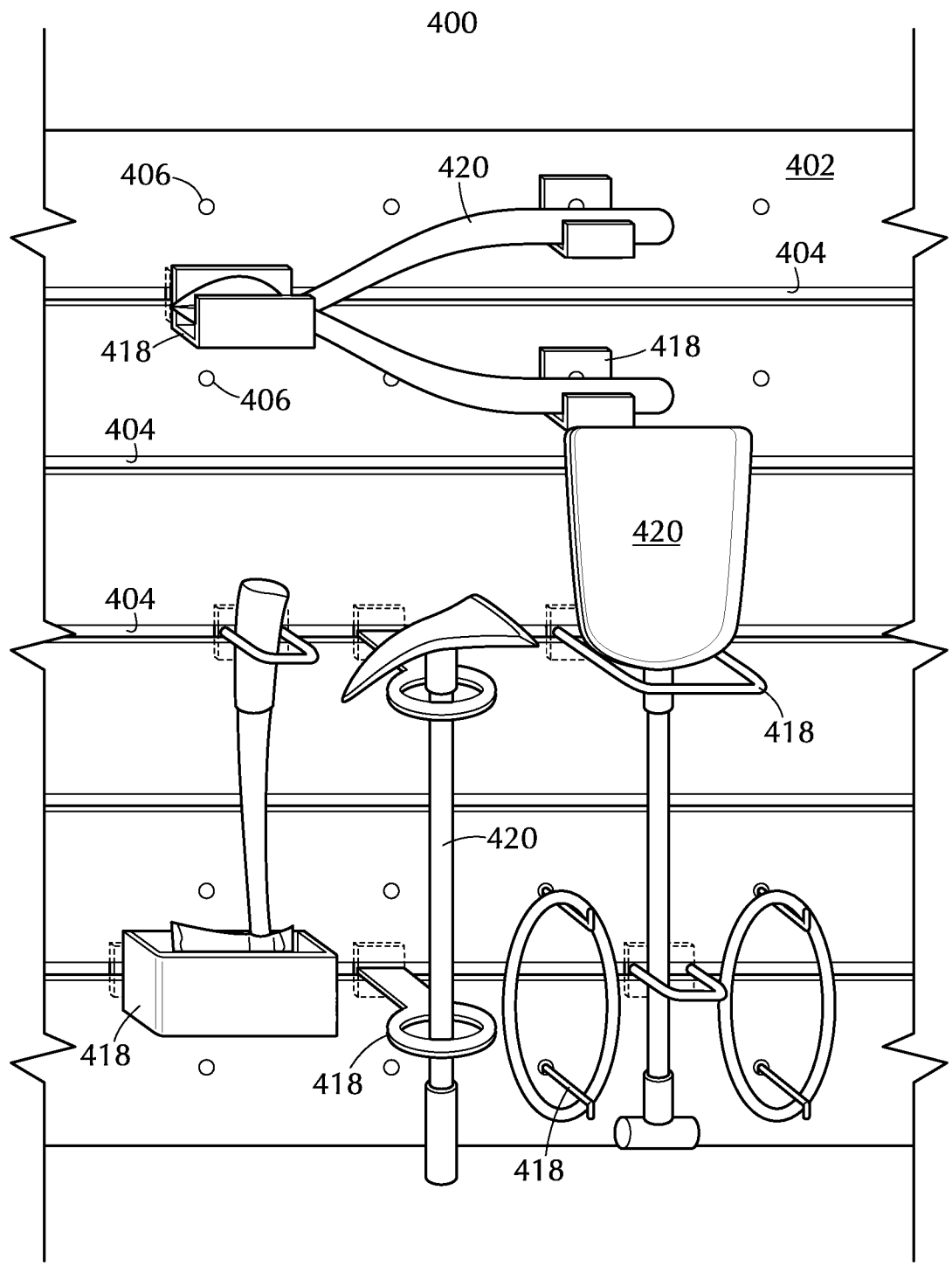
FIG. 4 illustrates a fragmentary plan view of the invention with an example of a tool layout configuration according to yet another aspect of the present invention.

Another embodiment of a hanger board assembly 400 is illustrated in FIG. 4. This embodiment depicts a plurality of tools 420 that are mounted on a mounting platform body member 402 using a variety of hanger elements 418 that are held in place on the mounting platform body member 402 in a plurality of slot elements 404 and a plurality of hole elements 406. While an initial tool layout may be done by eye or by trial and error, the inventor recognized that the use of a template (not shown) may be advantageous for machining the mounting platform body member's dimensions, the plurality of slot elements 404, and the plurality of hole elements 406 design in addition to efficiently arranging the final tool layout on the hanger board assembly 400. The template (not shown) may be a physical embodiment comprising a piece of cardboard cut to fit, and/or be created by computer design software programmed to make the most efficient use of the space and/or best fit the user's spatial needs. The plurality of tools 420 can be adjusted as necessary to meet the needs of the particular user. The plurality of tools 420 can comprise flathead and pick-head axes, pike poles, Halligan bars, flashlights, spanner wrenches, chain saws, hydraulic rescue tools, spreaders, cutters, rams, personal protective equipment, bunker gear, self-contained breathing apparatus (SCBA). In addition, the inventor envisioned all devices that can be hung on a mounting platform body member comprising kitchenware, utensils, catalogue racks, garage tools and other devices or components known by those of skill in the art.

The hanger board assembly 400 may be manufactured with traditional tools, known by those of skill in the art in a machine shop, for example, and customized for each customer. However, a computerized machining process comprising computer numerical control, ultrasound, laser and fiber-optic measurement equipment may also be employed in creating the exact dimensions and geometry of the mounting platform body member 402 and other measuring techniques/equipment known by those of skill in art. Other uses for computer software in the design process comprise inputting the size, shape, and capacity of all of the compartments on the vehicle to determine optimal tool layout on the entire vehicle, consideration of preferred tool locations for a particular user, and any other considerations or input that one of ordinary skill in the art would consider in determining tool placement. In the embodiment above the plurality of slot elements are t-shaped. However, there are many other shaped mounting slots and linear mounting brackets known by one of skill in the art, comprising L shaped slots, circular slots, D shaped slots and complex shapes. In addition, any other automated process or combination of techniques comprising using computer aided design software may be used in the manufacturing process. The inventor also considered software that calculates factors comprising, for example, stress analysis, kinetic analysis, and dynamic analysis of, for example, the entire hanger board assembly 400, the hanger elements 418, the fasteners (not shown) for the tools 420, the plurality of tools 420 arranged in various configurations to ensure the safest design and demonstrate that the entire hanger board assembly 400 will hold up satisfactorily in the event of an accident, such as a vehicle crash. Similarly sensors comprising stress, temperature, pressure, strain and compression sensors may be mounted on the invention to assist in determining areas that may require reinforcement.

A plurality of sensor elements (not shown) may be positioned on a hanger board assembly to warn a user if a tool is not properly fastened to the mounting platform body member 402, for example, or if a tool is missing from its bracket. The plurality of sensor elements (not shown) may be combined with a display screen to provide a visual diagram of the tool layout. The sensor elements may comprise proximity sensors, RFID components for tool or bracket locations, bar tags, contact sensors, lasers, magnets, audible and/or visual alarms, and the like, or of any sensor known to one skilled in the art. Also, a hanger board assembly may be controlled and/or be movably attached to a deploying mechanism (not shown) that opens the vehicle compartment door and moves the hanger board assembly out of the compartment for easy access of the mounted tools by remote. Similarly, a plurality of hanger board assemblies may be attached to the inside of a compartment so that all of the compartment space is used for tool storage instead of just the compartment surface space. For example, three hanger board assemblies could fit in hinged slots on the compartment floor where a rear board is mounted to the back wall, a middle board is four inches forward from the back wall, and a front board is six inches forward from the middle board.

Figure 5:
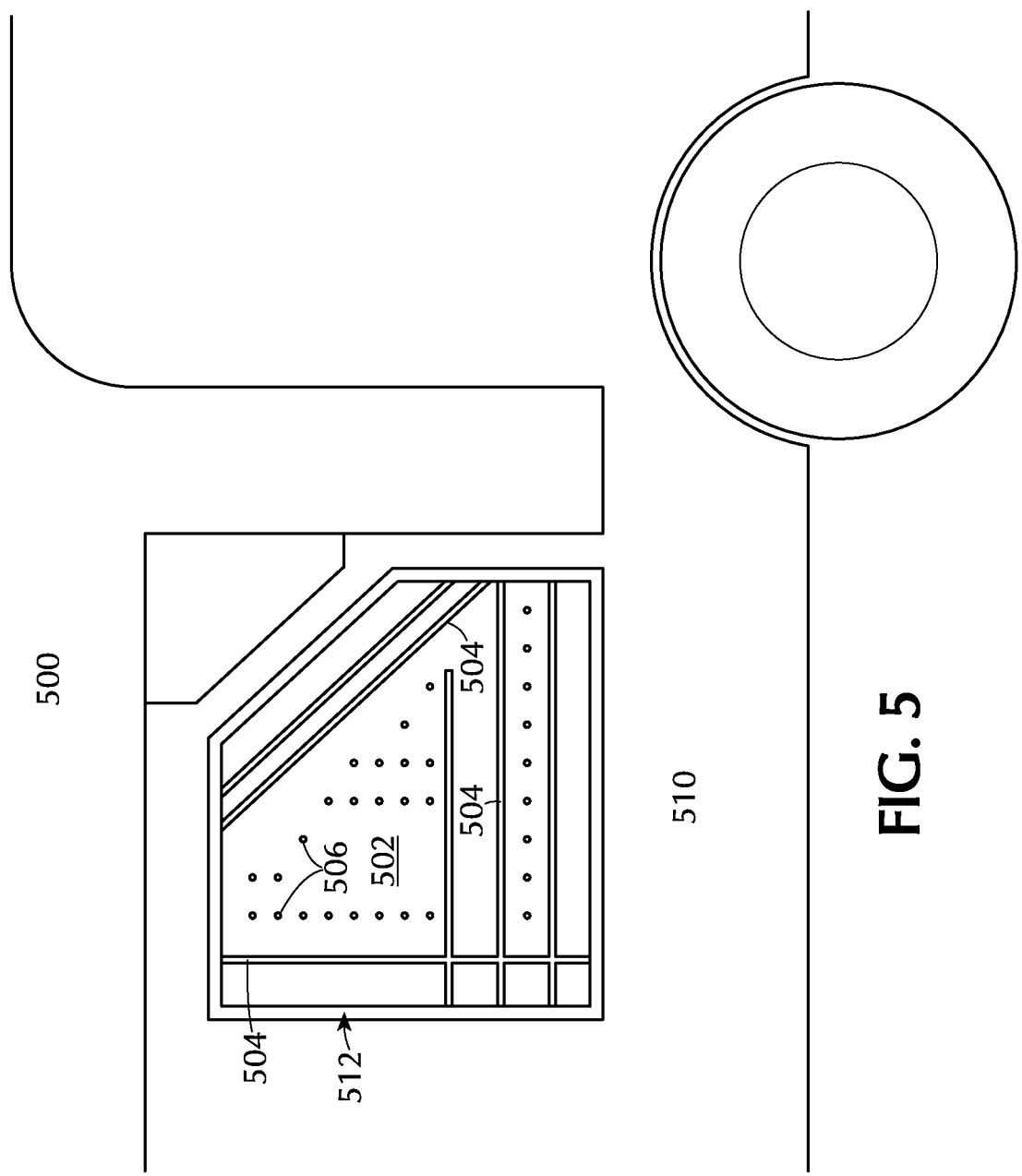
FIG. 5 illustrates a plan view of the invention fit to a vehicle compartment according to yet another aspect of the present invention.

Another embodiment of the hanger board assembly 500 is illustrated by FIG. 5. The embodiment demonstrates a mounting platform body member 502 that is irregularly shaped and is affixed to a compartment surface 512 on a vehicle 510, for example, comprising a fire truck. Additionally, a plurality of slot elements 504 are shown in a variety of positions. The plurality of slot elements 504 are illustrated horizontally, vertically, at angles, and even intersecting on the mounting platform body member 502, for example. Similarly, a plurality of hole elements 506 can be located in a pattern comprising irregular layouts as opposed to a repeating pattern for exemplary purposes.

Figure 6:
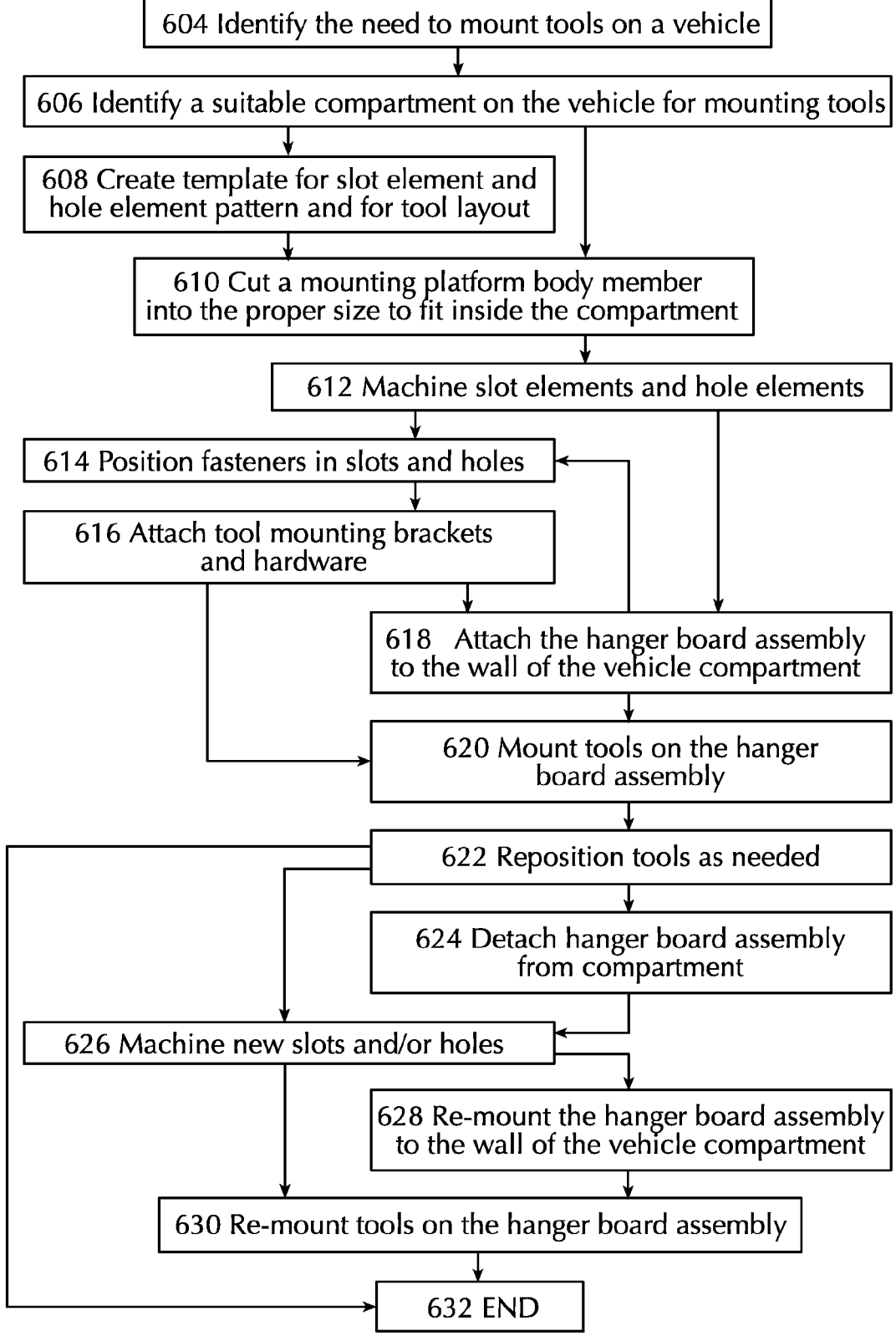
FIG. 6 demonstrates a method of mounting tools and equipment on a surface comprising the interior of a vehicle compartment according to another aspect of the present invention.

Illustrated in FIG. 6 is a block diagram illustrating an exemplary method 600 for mounting tools and equipment on a surface comprising a vehicle compartment wall according to one or more aspects of the present invention. The method 600 will be described with respect to FIGS. 4 and 5. Referring now to FIG. 6, the exemplary method 600 is illustrated that may be advantageously employed in association with the vehicle 510, however, the method 600 is not limited to mounting equipment on a particular type of vehicle, but also applies to mounting tools on surfaces comprising construction vehicles, heavy equipment vehicles, transportation vehicles, trailers, campers, recreational vehicles, trains, shipping vessels, aircraft, watercraft, ambulances, firefighting vehicles, emergency vehicles, building walls, stationary surfaces, and the like, or on any other surface that would benefit from a system for mounting objects comprising tools, utensils, paintings, and objects known by those of skill in the art. The method begins at 602, wherein at 604, a need is identified to mount the plurality of tools 420 on the vehicle 510, for example. At 606 the compartment surface 512 is chosen. Optionally at 608, a template (not shown) for the mounting platform body members 402, 502 geometry and the plurality of slot elements 404, 504 and the plurality of hole elements 406, 506 may be created manually or with computer software utilizing a CNC machine, for example. The mounting platform body members 402, 502 are cut to size at 610 and the plurality of slot elements 404, 504 and the plurality of hole elements 406, 506 are machined into the mounting platform body member 402, 502 at 612.

The method 600 then proceeds to optionally position fasteners (not shown) in the plurality of slot elements 404, 504 and the plurality of hole elements 406, 506 at 614. At 616 the user can attach the variety of hanger elements 418, and then at 618 the user can attach the hanger board assemblies 400, 500 to the wall of the compartment surface 512. In the alternative, the hanger board assemblies 400, 500 may be first attached to the wall of the compartment surface 512 at 618 prior to positioning the fasteners (not shown) at 614 and attaching the tool mounting brackets 418 at 616. In any event, once the hanger board assembly 400, 500 is attached to the compartment surface 512 with the fasteners and the hardware 418 in place, the tools and equipment 420 are then mounted to the hanger board assembly 400, 500 at 620 and may be repositioned over time as needed at 622.

At this point, the method may end at 632. However, the method may optionally also proceed to either 624, where the hanger board assembly 400, 500 is removed from the vehicle compartment 512 and new plurality of slot elements and/or new plurality of hole elements are machined into the mounting platform body member 402, 502 at 626, and the hanger board assembly 400, 500 is re-mounted at 628; or the hanger board assembly 400, 500 is left in place and at 626 the new plurality of slot elements and/or the new plurality of hole elements are machined into the mounting platform body member 402, 502 and the hanger board assembly 400, 500 is then re-mounted at 628. In either event, the method 600 then proceeds to 630 where the plurality of tools 420 are re-mounted on the hanger board assembly 400, 500 and the method ends at 632.

Although the invention has been illustrated and described with respect to one or more embodiments, implementations, alterations, and/or modifications may be made to the illustrated examples without departing from the spirit and scope of the appended claims. In particular regard to the various functions performed by the above described components or structures (assemblies, devices, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including". "includes", "having", "has", "with", or variants thereof are used in either the detailed description and the claims, such terms are intended to be inclusive in a manner similar to the term "comprising".

What is claimed is:

1. An emergency vehicle compartment adjustable tool mounting assembly for use in securing a plurality of tools to an emergency vehicle, the assembly comprising:
an adjustable platform body member comprising:
an outer surface;
an inner surface attachable within a compartment of the emergency vehicle; and
a plurality of machined T-shaped slots formed into the adjustable platform body member extending inward from the outer surface, wherein the machined T-shaped slots are formable prior to installation of the assembly within the compartment; and
a plurality of hole elements penetrating the adjustable platform body member; and
a plurality of standard fastening hardware for engaging the plurality of machined T-shaped slots and the plurality of hole elements of the adjustable platform body member and a plurality of tool holders useable to adjustably mount the plurality of tools to the assembly within the compartment of the emergency vehicle, wherein the plurality of tool holders are adjustably attached to the adjustable platform body member.

2. The emergency vehicle compartment adjustable tool mounting assembly of claim 1, wherein the plurality of machined T-shaped slots are located in the outer surface at approximately three inch intervals and the plurality of hole elements are oriented in varying positions between the plurality of machined T-shaped slots.

3. The emergency vehicle compartment adjustable tool mounting assembly of claim 2,
wherein the standard fastening hardware can be locked in any position along the plurality of machined T-shaped slots and
some of the plurality of machined T-shaped slots may be formed after the adjustable hanger board assembly has been installed in the compartment.

4. The emergency vehicle compartment adjustable tool mounting assembly of claim 3, wherein the emergency vehicle compartment adjustable tool mounting assembly is constructed from high density polyethylene.

5. The emergency vehicle compartment adjustable tool mounting assembly of claim 1, further comprising a plurality of hole insert elements, insertable within the plurality of hole elements for securing the standard fastening hardware within the hole elements.

6. The emergency vehicle compartment adjustable tool mounting assembly of claim 5, wherein the plurality of machined T-shaped slots are lined with a different material than that of the emergency vehicle compartment adjustable tool mounting assembly material.

7. The emergency vehicle compartment adjustable tool mounting assembly of claim 5, wherein the plurality of hole insert elements comprise: soft sleeves, ridged sleeves, anchors or threaded inserts.

8. An emergency vehicle adjustable hanger board assembly for use in mounting tools, the assembly comprising:
an adjustable mounting platform body member comprising:
an outer surface and an inner surface attachable within a compartment of the emergency vehicle that are machinable; and
a plurality of machined undercut channel slots formed into the adjustable mounting platform body member extending inward through the outer surface oriented horizontally, vertically, angled, and intersecting for receiving a plurality of standard fastening hardware; and
a plurality of machined mounting holes comprising a plurality of groupings of six holes oriented in varying positions between the plurality of machined undercut channel slots and extending through the outer surface of the adjustable mounting platform body member useable to adjustably attach a plurality of tool holders to the adjustable mounting platform body member so that the tools may be secured within the compartment by the tool holders.

9. The adjustable hanger board assembly of claim 8,
wherein each of the plurality of groupings of six holes comprise three top holes located above one of the plurality of machined undercut channel slots and three bottom holes located below the same one of the plurality of machined undercut channel slots; and
wherein a first in line of the three bottom holes is located approximately 3.375 inches directly below a first in line of the three top holes, a second in line of the three bottom holes is located approximately 2.5 inches directly below a second in line of the three top holes, and a third in line of the three bottom holes is located approximately 3.375 inches directly below a third in line of the three top holes.

10. The adjustable hanger board assembly of claim 9, wherein the plurality of machined undercut channel slots are T-shaped and approximately 0.375 inches in depth with an opening in the outer surface approximately 0.265 inches in width.

11. The adjustable hanger board assembly of claim 9, wherein the adjustable hanger board assembly is mountable to a firefighting apparatus.

12. The adjustable hanger board assembly of claim 11, wherein a thickness of the adjustable mounting platform body member is two tenths of an inch or greater.

13. The adjustable hanger board assembly of claim 12,
wherein the standard fastening hardware comprises at least one of the following fasteners: bolts, rivets, nuts, or screws; and
wherein the machined mounting holes accept the standard mounting hardware from the outer surface or the inner surface of the adjustable mounting platform body member.

* * * * *